(12) United States Patent
Aikens et al.

(10) Patent No.: US 10,666,185 B2
(45) Date of Patent: May 26, 2020

(54) PHOTOVOLTAIC POWER APPARATUS FOR RAPID DEPLOYMENT

(71) Applicant: Justin S. Aikens, Quincy, MA (US)

(72) Inventors: Justin S. Aikens, Quincy, MA (US); Walter Cowham, Quincy, MA (US)

( * ) Notice: Subject to any disclaimer, the term of this patent is extended or adjusted under 35 U.S.C. 154(b) by 405 days.

(21) Appl. No.: 15/160,066

(22) Filed: May 20, 2016

(65) Prior Publication Data
US 2016/0285404 A1  Sep. 29, 2016

Related U.S. Application Data

(63) Continuation of application No. PCT/US2014/065852, filed on Nov. 16, 2014.

(60) Provisional application No. 61/905,817, filed on Nov. 18, 2013.

(51) Int. Cl.
| | |
|---|---|
| *H02S 10/40* | (2014.01) |
| *H02J 7/00* | (2006.01) |
| *H02S 30/20* | (2014.01) |
| *F24S 25/70* | (2018.01) |
| *F24S 30/00* | (2018.01) |
| *F24S 25/00* | (2018.01) |

(52) U.S. Cl.
CPC .............. *H02S 10/40* (2014.12); *F24S 25/70* (2018.05); *H02J 7/0042* (2013.01); *H02S 30/20* (2014.12); *F24S 2025/012* (2018.05); *F24S 2030/115* (2018.05); *Y02E 10/47* (2013.01)

(58) Field of Classification Search
USPC .................................................. 136/243–265
See application file for complete search history.

(56) References Cited

U.S. PATENT DOCUMENTS

| | | | |
|---|---|---|---|
| 3,289,868 A | 12/1966 | Miller et al. | |
| 3,749,363 A * | 7/1973 | Hauser | B65D 90/143 |
| | | | 254/45 |
| 5,487,791 A | 1/1996 | Everman et al. | |
| 5,969,501 A | 10/1999 | Glidden et al. | |
| 6,396,237 B2 | 5/2002 | Benn et al. | |
| 6,396,239 B1 | 5/2002 | Benn et al. | |
| 7,230,819 B2 | 6/2007 | Muchow et al. | |
| 7,795,837 B1 | 9/2010 | Haun et al. | |
| 8,253,086 B2 | 8/2012 | Zalusky et al. | |
| 8,291,647 B2 | 10/2012 | Esposito | |
| 8,299,645 B2 | 10/2012 | Muchow et al. | |
| 8,365,479 B2 | 2/2013 | Tucker | |
| 2008/0196758 A1 | 8/2008 | McGuire | |

(Continued)

*Primary Examiner* — Dustin Q Dam
(74) *Attorney, Agent, or Firm* — Cesari and McKenna, LLP

(57) ABSTRACT

A rapidly deployed photovoltaic (PV) apparatus (2) providing a PV array (10) housed within an easily transportable standardized container. The PV array (10) is movable between a stowed position in a V-shape configuration and a fully deployed flat position. Dual function hydraulic cylinders are provided for movement of the array (10) in the fully deployed position and movement of the container when the array (10) is in the stowed position. Solar tracking of the array (10) is facilitated by linear compensation translators which are attachable to the hydraulic cylinders upon full deployment. A retractable roof structure is provided which allows trickle charging to occur when the array (10) is in the V-shaped stowed position.

14 Claims, 9 Drawing Sheets

(56) References Cited

U.S. PATENT DOCUMENTS

| | | | |
|---|---|---|---|
| 2010/0206354 A1* | 8/2010 | Greene, Jr. | H02S 30/20 |
| | | | 136/245 |
| 2011/0146751 A1* | 6/2011 | McGuire | F03D 9/007 |
| | | | 136/245 |
| 2011/0253614 A1 | 10/2011 | Curran et al. | |
| 2012/0085387 A1 | 4/2012 | French | |
| 2012/0313569 A1 | 12/2012 | Curran | |

* cited by examiner

PHOTOVOLTAIC POWER APPARATUS FOR RAPID DEPLOYMENT

CROSS-REFERENCE TO RELATED APPLICATIONS

The present application is a continuation of U.S. patent application Ser. No. PCT/US14/65852, filed on Nov. 16, 2014, which claims the benefit of U.S. Provisional Patent Application Ser. No. 61/905,817, filed on Nov. 18, 2013. The above-identified patent applications are hereby incorporated by reference in their entirety.

BACKGROUND

Technical Field

The present invention relates generally to photovoltaic power generation. More particularly, the present invention relates to photovoltaic power systems for rapid deployment, portability, and redeployment.

Background Information

In the field of power generation, there are many examples of standalone systems not tied to the power grid. Such standalone systems often involve a generator fueled by a hydrocarbon-based fuel such as gasoline, diesel, or propane. However, some such is systems are wind or solar powered in terms of a blade driven rotary turbine or photovoltaic array, respectively. Still further, some such systems function through a combination of wind, solar, or fuels. Several of such systems is discussed as follows.

U.S. Pat. No. 5,487,791 issued to Everman et al. on 30 Jan. 1996 embodies a stowable and self-deployable parallelogram-type panel array for solar cells. The array includes two sets of rigid panels, the panels of each set being hinged together, and the sets extending side-by-side along a central axis. The sets are foldable, and are pivoted together at their central points so as to form parallelogram-type structures. A respective yoke is hinged to each set to coordinate the movement of the sets. The yokes are hinged to a base on the opposite side of the axis from their respective set to provide greater structural stability and a higher first node resonant frequency. Deployment force is exerted by self-powered hinges, and are the only source of deployment force. The yokes are joined by gears to coordinate their rotation and thereby the stowing and deploying of the array.

U.S. Pat. No. 5,969,501 issued to Glidden et al. on 19 Oct. 1999 embodies a trailer mounted, self-contained solar power system having a plurality of solar panel sections that are arranged to fold about the sides and top of the trailer. The panel sections unfold and lock together through slide rams that are contained within a rack structure supporting the panel sections to form a planar array that is easily deployable at a desired angle to the horizontal. The planar array pivots about a hinge along one side of the trailer top, and the panel sections are asymmetrically arranged for positioning of the planar array.

U.S. Pat. No. 6,396,239 issued to Benn et al. on 28 May 2002 embodies a portable photovoltaic modular solar generator. A plurality of wheels are attached to the bottom of a rechargeable battery container. At least one rechargeable battery is contained inside the rechargeable battery container. A power conditioning panel is connected to the rechargeable battery container. At least one photovoltaic panel is pivotally connected. In one embodiment, the rechargeable battery container is a waterproof battery enclosure having a knife switch connection. A mast having a rotation bar is supported by the waterproof battery enclosure. At least one solar panel support brace for supporting the photovoltaic panel is attached to the rotation bar. The power conditioning panel is waterproof and is attached to the mast and has a door. When the door is opened, at least one safety switch is opened, breaking an electric circuit. The waterproof power conditioning panel has a charge controller and an inverter. The charge controller is electrically connected to at least one rechargeable battery and at least one photovoltaic panel, and is capable of receiving auxiliary power inputs.

U.S. Pat. No. 7,230,819 issued to Muchow et al. on 12 Jun. 2007 embodies a mobile power system for producing power at a desired location. That system includes a first power generating device of a first type coupled to a transportable housing, and a second power generating device of a second type coupled to the transportable housing. The first type of power generating device is different than the second type of power generating device. According to one embodiment, the mobile power system may provide easy access to different types of power outputs. Further, the housing may have the approximate size of a standard freight container.

U.S. Pat. No. 7,795,837 issued to Haun et al. on 14 Sep. 2010 embodies a portable solar power supply trailer with a security containment area and multiple power interfaces. The trailer has a trailer frame with wheels on axles and a support hitch. An enclosure on the trailer frame covers about 25 percent of the trailer frame and a solar array frame is disposed on the enclosure. The solar array frame covers the entire trailer frame and the enclosure, and the solar array frame has at least one photovoltaic cell. The enclosure has plurality of power interfaces for access by a user external to the enclosure, a plurality of batteries, a solar controller, a power interface timer in the enclosures for providing power to the power interfaces, and two posts and two supports for supporting the solar array frame.

U.S. Pat. No. 8,253,086 issued to Zalusky et al. on 28 Aug. 2012 embodies a solar collector can be rotated and tilted about a polar mount. The solar collector can be designed such that the center of gravity of the collector is aligned with the axis of the polar mount facilitating the use of smaller positioning devices. The collector can be placed in a position to prevent damage by inclement weather and allow access for maintenance and installation.

U.S. Pat. No. 8,291,647 embodies a self-contained structure configurable as a shipping container and as a dwelling. The self-contained structure configurable as a shipping container and as a dwelling includes a lower section including a platform and a floor, the lower section forming a first portion of a foundation of the dwelling; an upper section including a ceiling and connected to the lower section to define a cavity, the upper section forming a first portion of a roof of the dwelling; a plurality of wall components attached to the lower section and the upper section within the cavity to form subcavities within the cavity; a plurality of panels attachable to the lower section and the upper section to enclose the cavity when the structure is configured as the shipping container and attachable to the upper section to form a second portion of the roof of the dwelling extending from the first portion of the roof to define an approximate area of the dwelling when the structure is configured as the dwelling; and a plurality of extension walls storable within the subcavities when the structure is configured as the shipping container and configurable to enclose the approximate area of the dwelling when the structure is configured as the dwelling.

U.S. Pat. No. 8,299,645 issued to Muchow et al. on 30 Oct. 2012 embodies a trailer that includes a frame defining a body of the trailer. The trailer also includes a power system stored in the body of the trailer. At least a portion of the power system is integral to the body of the trailer. The power system includes at least one power generating device stored in the body and removable from the body.

U.S. Pat. No. 8,365,479 issued to Tucker on 05 Feb. 2013 embodies a standalone or partially standalone solar photovoltaic structure and methods for assembling the structure. The solar photovoltaic structure can employ a hinged photovoltaic roof deck that can be folded for transportation. Described are hinges that can be removed after assembly and act as protective elements to facilitate transportation. Also described is an attachment arrangement for joining purlin or frame members to vertical support columns by locking the frame numbers into column capitals.

U.S. Published Patent Application No. 2008/0196758 filed by McGuire on 21 Aug. 2008 embodies a self-sustaining, portable, power station that may be moved by land, air, or sea to an area that has no utilities. The station is provided with at least one wind turbine and/or solar panel arrays in communication with at least one electrical distribution and storage means. The derived electricity is used to power various systems including, albeit not limited to, a communications system, a water filtration system, a water distribution system to allow the public to draw potable water and provide basic hygiene. The electricity derived may also be used to run outside systems, such as schools, hospitals, or the like.

U.S. Published Patent Application No. 2012/0313569 filed on Curran on 13 Dec. 2012 embodies a solar panel deployment system includes a main support frame and a solar panel array providing at least one solar panel, wherein the solar panel array is coupled to the main support frame, and each of the solar panels are mounted in a solar panel frame. The system also includes a lift mechanism coupled to the main support frame and solar panel array, and an array extender/retractor coupled to the solar panel array, wherein the array extender/retractor is actuated to deploy the solar panel array or to retract the solar panel array.

While the above examples of standalone power systems provide improvements on prior technology, they do so at a cost of complexity and related unreliability. It is, therefore, desirable to provide a robust power system capable of rapid deployment and redeployment.

SUMMARY OF THE INVENTION

It is an object of the present invention to obviate or mitigate at least one disadvantage of previous standalone power systems. Moreover, the present invention provides a self-contained power system having a rapidly deployable PV array which is quickly and easily established in the field by minimal human intervention. The inventive system is also quickly retracted and contained for movement and redeployment in another location. The robust nature of the present invention and the ease with which the invention is deployed and redeployed provides a versatile standalone power system that may reach distant locations typically underserved by a standard electrical grid. Further, the rapid deployment and robustness of the present invention lends itself to emergency situations where there may be some breakdown in the standard electrical grid such as after natural disasters or any man-made calamity.

In a first aspect, the present invention provides a photovoltaic (PV) power system for rapid deployment, the system including: a housing; a PV array having a collection of solar panels mounted upon a frame, the frame including two sections connected via a lengthwise hinge such that the PV array forms a V-shaped cross section when placed in a stowed position within the housing, the PV array being capable of movement from the stowed position to a deployed position atop the housing; a plurality of hydraulic cylinders, each the hydraulic cylinder being mounted within a support, the support being attached to the housing via at least one hinge; a pivot point located on each the support and about which each the hydraulic cylinder is capable of rotation between an upwardly actuating position to a downwardly actuating position; and wherein the hydraulic cylinders in the upwardly actuating position provides movement of the PV array and the hydraulic cylinders in the downwardly actuating position provides movement of said housing.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The description below refers to the accompanying drawings, of which.

Embodiments of the present invention will now be described, by way of example only, with reference to the figures.

DETAILED DESCRIPTION OF AN ILLUSTRATIVE EMBODIMENT

In general, the present invention includes three primary elements including a housing, a PV array, and electrical components to obtain useful electrical output from the PV array and provide such output as an electrical supply used, for example, in nearby housing. These three general elements will now be discussed in further detail.

The housing is preferably formed from a standardized steel shipping container or a custom-built container from an original equipment manufacturer (OEM) capable of adherence to the standards promulgated by the International Organization for Standardization (ISO). Whether the housing is a customized ISO container or an OEM container explicitly manufactured for the present invention is a matter of cost and availability. One useful and important aspect of the present invention is the ubiquitous nature of ISO container in the freight shipping industry. One need not go far to stumble upon an unused or underutilized ISO container. Indeed, such ISO containers which may have otherwise been rendered surplus, may be given new use in the context as a housing for the present invention. Thus, "recycling" an existing surplus ISO container by modifying it for use as the housing may be useful in keeping costs at minimum. However, an OEM container custom-built as the housing of the present invention is possible and cost reduction may be obtained through scale of production. In either event, it is important to note the commonality of the housing being standardized (i.e., size, corner fittings or slots for forklift crane/tie-downs, etc.) and durable (e.g., steel with corrugated surfaces) for shipping purposes.

The second primary element of the present invention is a PV array. The array itself is formed by multiple solar panels. The details of such solar panels is not considered critical to the present invention as standardized panels may be assembled to form the PV array. However, the frame upon which the PV array of panels rests is advantageously configured to stow within the housing.

Figure 1:
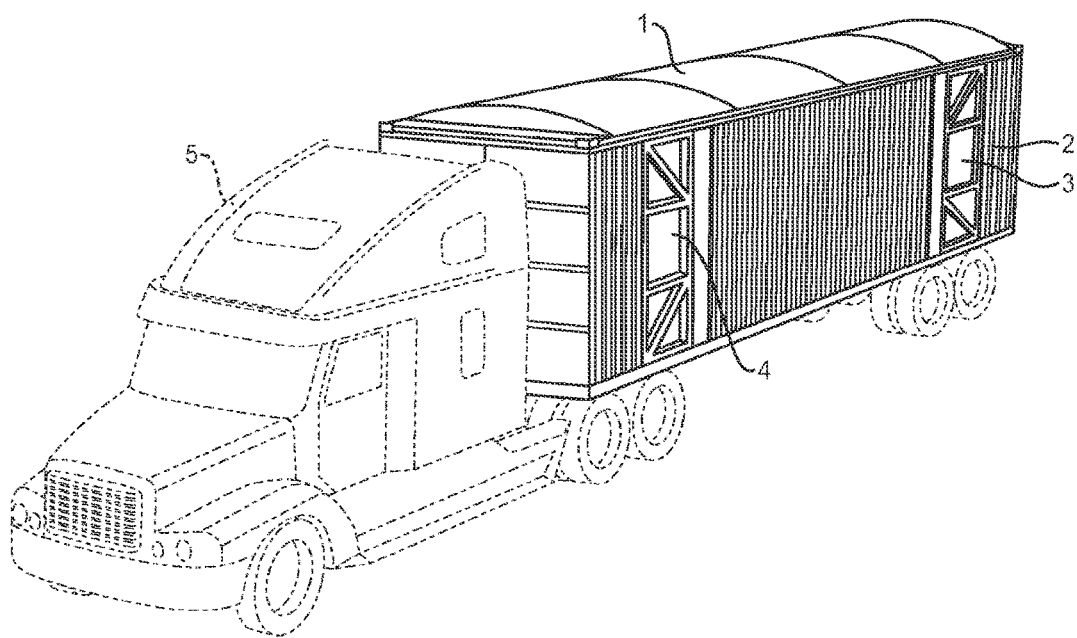
FIG. 1 is a generalized schematic showing an embodiment a rapid deployment PV system in accordance with the present invention in its mobile stage.

With regard to FIG. 1, there is shown a generalized schematic the present inventive rapid deployment PV system 2 in its mobile stage upon a flatbed truck 5. The truck 5 is shown in silhouette as it is not important what type of vehicle is used to transport the inventive apparatus. Rather, any vehicle suitable for supporting the relatively flat underside of the system 2 is possible without straying from the intended scope of the invention. Here, the system 2 is seen to include a roof 1 and "door-like" piston support structures 3, 4. It should be noted that additional piston support structures are included on the opposite side though not visible in this illustration.

Figure 2A:
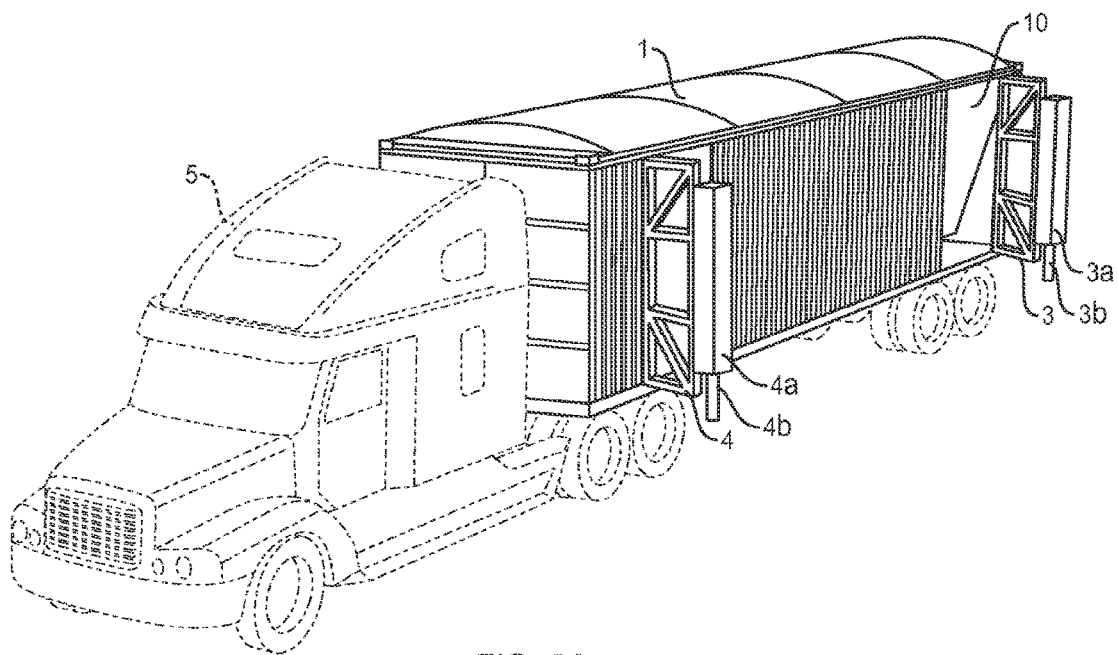
FIG. 2A shows the embodiment as seen in FIG. 1 wherein the hydraulic pistons are being extracted from a stored position.

More specifically and with regard to FIGS. 2A through 2O, there are shown the deployment stages of an embodiment of the present invention including a housing and a PV array during the stowed position within the inner cavity of the housing. The frame is formed in two identical halve sections hinged along a central axis. In the stowed position, the frame rests in a V-shape with the PV array facing upwards towards the opening atop the housing. Once fully deployed, the frame hinge is locked in an open position to form one contiguous planar surface upon which the PV array of panels rests. Once in the fully deployed position, the PV array has the ability for movement in a manner that tracks the position of the Sun.

While it is readily known within the teachings discussed in the aforementioned Background section that folding PV arrays may be deployed from a storage position to a movable position allowing solar tracking, the present invention provides advantages in the manner in which such storage and deployment occurs and in the requisite structural elements provided for such storage and deployment. Such inventive features are discussed in more detail further herein below.

The third primary element of the present invention is the electrical componentry provided to obtain useful electrical output from the PV array. These electrical components may include all necessary wiring, electrical connections, batteries for storage of electricity produced, inverter circuitry for conversion from direct current (DC) to alternating current (AC), surge protection, and any other electrical component which one of ordinary skill in the art of power generation would require for any given implementation of the present invention. For example, one implementation may require DC to AC inversion to a system in the jurisdiction of Eritrea where local electrical requirements dictate a need for an output of 230 V at 50 Hz Likewise, implementation of the present invention in the jurisdiction of El Salvador would require an output of 115 V at 60 HZ. Still further, some isolated locations may be established on purely a DC system which may benefit from the present invention. Indeed, the present invention is not limited to fixed (i.e., land-based vs. mobile-centric) implementations like solar power generation for a housing development, but may further be implemented to supply power to, for example, a fleet of DC power based vehicles or vessels. It should therefore be readily apparent that any such variation in the electrical components required to support an implementation in any setting is possible without straying from the intended scope of the present invention.

One inventive feature of the useful electrical output from the PV array is that the present invention may serve as a charging station—i.e., by providing an electrical system for charging batteries in a public arena. Such batteries may be those found within a cellphone or any portable electronic device, or, as in developing countries, portable deep-cycle batteries used to replace fossil fuel powered lighting in off-grid areas of the globe. In order to provide a charging station that is secure, it is necessary to provide suitable storage for the devices. A moisture resistant electronic devices case to hold the device requiring charging and having the ability to be locked and unlocked by code, key, etc., may be plugged into the side of the station via a locking plug. The plug would have the properties of being resistant to cutting. This plug would allow the owner of the device to retrieve it by entering a code, key, etc. The case would open, and the plug would be ejected, leaving the port available for the next user. This feature is especially useful in disaster areas where electrical power maybe rendered unreliable.

Another inventive feature related to the present invention serving as a charging station may involve a standardized portable battery pack. The battery pack would be portable via any suitable mechanism available in any given developing country including, but not limited to, hand carrying with or without a wheeled base, transport atop a motorbike or ordinary bicycle, transport atop a pack animal, or any other suitable mode of transport. The portable battery pack would of course be limited in electrical capacity due to its related size. However, in most developing countries such battery would be sufficient for simple household lighting implementation based upon high efficiency LED devices. In this scenario, standardized portable battery packs may be marketed as a value-added item to be implemented in conjunction with the overall inventive unit.

Though the present invention is directed towards a PV system, it should also be understood that coupling the PV electrical power generation with a backup type of power generation may be useful and/or required in implementations where hours of sunshine are limited. For example, a co-located fossil fuel-powered electrical generation system could be used in conjunction with the present invention.

Indeed, an auxiliary generator in the form of a small diesel powered electrical generator for example may be provided and even placed within the housing of the present invention to ensure power to operate, at a minimum, motive elements of the present invention. Such motive elements may include a hydraulic pump, winch motor, or any other such device as described further herein below. The output power of the auxiliary generator may also support exterior lighting or any other requirement depending on the sizing of the given generator implemented. Details of such auxiliary generator are outside the scope of the present invention and well within the skill of one ordinarily experienced in fossil fuel powered generators and will not be discussed in any further detail.

It has been now noted that the three primary elements of the present invention include the housing, the PV array, and the electrical components to facilitate useful transfer of solar power to any required use. As mentioned, batteries may be used and are indeed preferable to be co-housed within the apparatus of the invention. Battery usage therefore allows electrical storage of unused power generated by the PV array for times of increased usage and/or times of decreased solar activity. Again, the details of battery technology is well known to those of ordinary skill in the art and will not be described in any detail herein.

Having now discussed the basic elements of the present invention so as to provide the context within which the inventive concepts reside and are implemented, further specific details of the present invention will now be described in terms of the requisite structural elements provided for innovative storage and deployment of the PV array.

The present inventive system is a fully assembled unit that requires minimal on-site assembly in order to bring the system and its power generation to full operation. To do so, the inventive system includes a dual function hydraulics feature. The dual function hydraulics serve in the first instance to raise and lower the unit which is completely contained within the housing and in the second instance to move the solar panel once deployed atop the housing so as to track the sun. This unique dual function hydraulics feature reduces the complexity of the overall inventive system by the use of the same hydraulic components in differing configurations and for very different functions.

The dual function hydraulics are discussed with regard to FIGS. 2A through 2O. The dual function hydraulics feature includes a set of four hydraulic devices which include cylinders and a related piston. With specific regard to the figures shown, there are two such structures visible including hydraulic cylinders 3*a* and 4*a* which include related pistons 3*b* and 4*b*. Each hydraulic cylinder 3*a* and 4*a* is mounted on a corresponding cylinder support 3 and 4. As previously mentioned, two other sets of cylinders, pistons, and supports are located on the opposite side of the apparatus though not visible. In turn, each cylinder support is respectively affixed near one of the four corners of the housing via a hinge. The hinge allows its given cylinder support to swing in a door-like manner away from the external surface of the housing. When all cylinder supports have been swung from their stored position flush within the housing frame to their working perpendicular position at a 90 degree angle from the external surface of the housing, then the cylinder supports are secured in place in the working position. The cylinder supports themselves are a steel frame with sufficient bracing to withstand forces created by the weight of the fully assembled unit. Additional bracings are preferably between the housing and each of the fully opened cylinder supports whereby such additional bracing prevents any movement of the cylinder support about the hinge thus locking each cylinder support into its respective perpendicular position. Alternatively, securing the cylinder supports in place may be accomplished via any locking mechanism including, but not limited to, one or more locking pin(s) manually inserted through the steel frame of the cylinder support and into the adjacent frame of the housing.

Deployment of the inventive apparatus occurs in stages. Initially, the flatbed truck used to transport the unit will be parked atop the area where the unit will be deployed. Preferably, a relatively flat area is chosen which of course should also have a full exposure to open sky. Once parked, the truck operator would move each cylinder support from its stored position to its working position, then use the controller to raise the unit off of the truck bed. Quick-connect feet in the form of a vertical tube with attached horizontal pad is preferably slipped over the end of the cylinder piston to provide a stable base upon which the cylinder interfaces with the ground surface. Extension of each cylinder in a coordinated manner will then lift the unit off the truck. It should be noted that this coordinated actuation of the cylinders is preferably accomplished through a computer controlled automatic function with a self-leveling feature as this would eliminate human error. A variety of sensors may be utilized for providing feedback to ensure the unit maintains a proper orientation in a balanced and level position. Once fully raised, the truck is be moved out from under the unit. As before, the raised unit would simply be lowered via the push-button controller until the unit was resting securely upon the ground. Ideally, the ground would be as level as possible. However, additional blocking or any suitable leveling mechanism may of course be placed under the unit prior to lowering in order to ensure a relatively level placement of the unit upon the ground.

FIG. 2A shows the embodiment as seen in FIG. 1 wherein the hydraulic devices (3*a*, 3*b*) and (4*a*, 4*b*) are being extracted from a stored position. Here, the cylinder supports 3 and 4 are shown in an open position swung to a 90 degree angle from the body of the container structure. Locking mechanisms may be used to secure the supports 3 and 4 in such an open position. As can be seen, the pistons 3*a* and 4*a* are extendable in a downward position. In this configuration, the bottom surface 10 of the array is visible inside the container when support 3 is open.

Figure 2B:
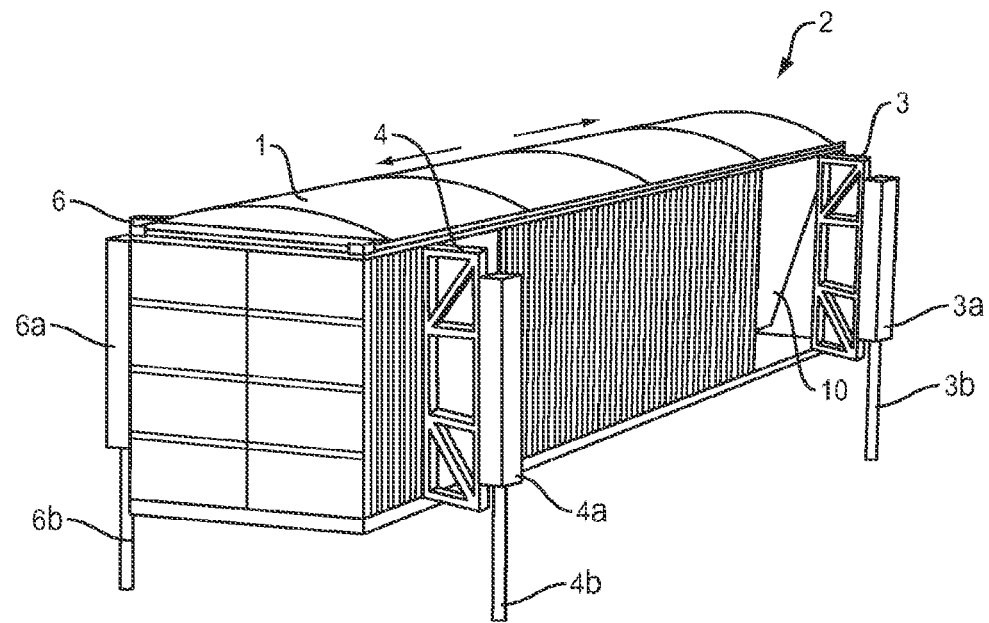
FIG. 2B shows the embodiment as seen in FIG. 2A wherein the hydraulic pistons are extended to enable removal from a truck bed.

FIG. 2B shows the embodiment as seen in FIG. 2A wherein the pistons 3*b*, 4*b* and 6*b* are extended to enable removal from the given truck bed. It should be readily apparent that a total of four hydraulic devices are required by the present invention. Here, hydraulic devices 3*a*, 4*a*, and 6*a* are shown though the remaining one of the total of four is not visible. Removal from the truck in this stage can be accomplished as easily as extending the pistons while in the downward facing position as seen in FIG. 2A to effectively raise the inventive apparatus slightly off of the truck bed thereby enabling the truck to drive out from thereunder. The resultant stage is therefore as shown in FIG. 2B.

Figure 2C:
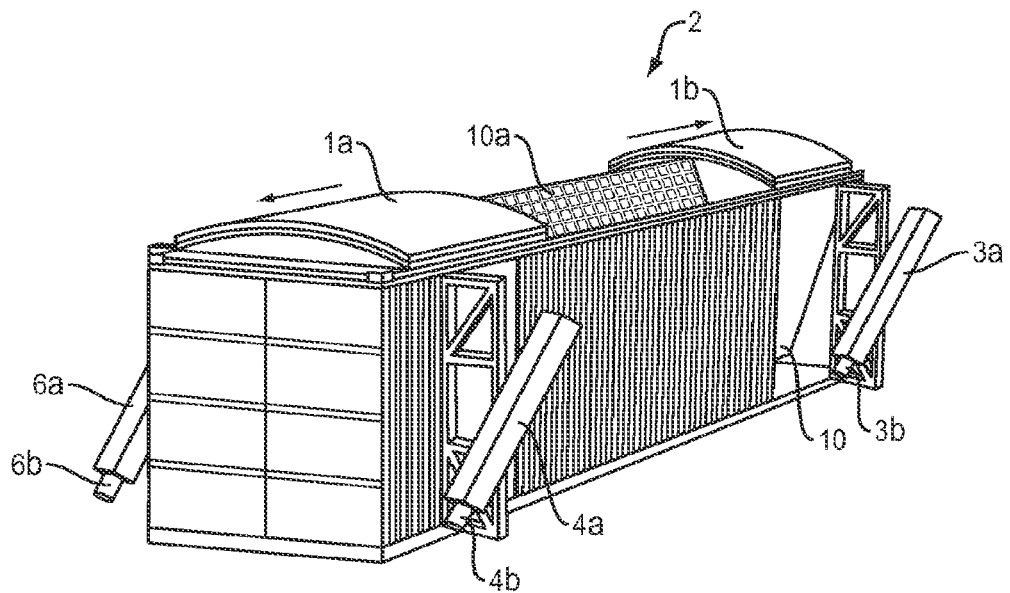
FIG. 2C shows the embodiment as seen in FIG. 2B wherein the hydraulic pistons are being rotated to enable array actuation and the roofing is retracting to enable array ejection.
Figure 2D:
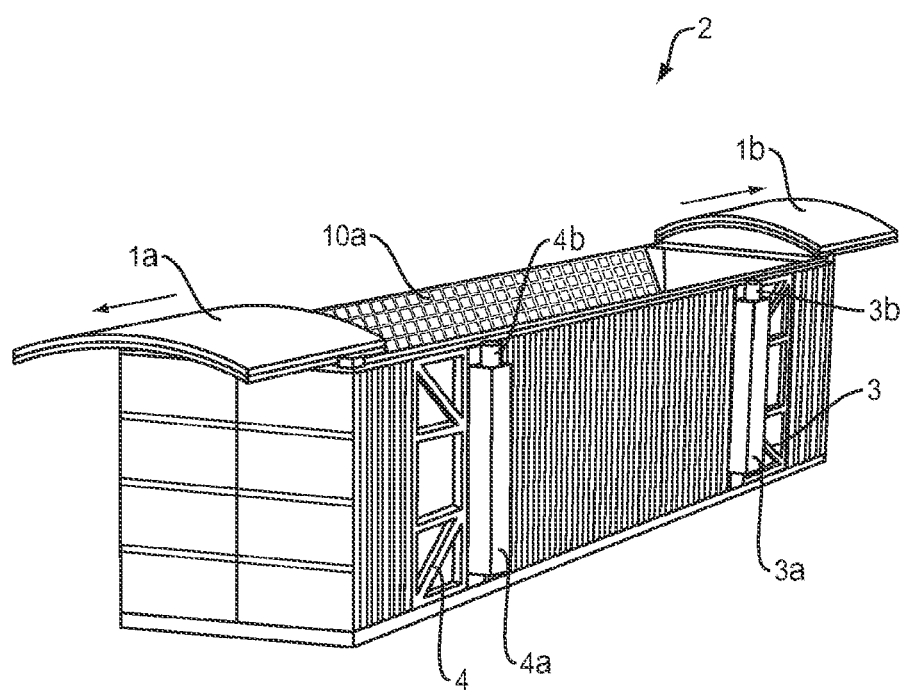
FIG. 2D shows the embodiment as seen in FIG. 2C wherein the hydraulic pistons are locked in an upward orientation to enable array actuation and the roofing is fully retracted to enable array ejection.

FIG. 2C shows the embodiment as seen in FIG. 2B wherein the hydraulic devices are being rotated from to enable array actuation. This rotation thus provides movement from a position where the pistons face downwards to a position where the pistons face upwards. Also shown occurring in this figure is the opening of the roof. Here, the roof 1 includes half sections 1*a* and 1*b*. Each half section is configured segment by segment to move vertically and then slide horizontally (movement is shown by arrows). As can be seen in FIG. 2C, the top surface 10a of the array is visible. In this manner, the roofing is retracting to enable array ejection and with further reference to FIG. 20 the roof section 1a and 1b are able to completely slide horizontally so as to allow the roofing to be fully retracted and thereby enable array ejection. It should be understood that the roofing sections are allowed to ride along tracks (not shown) in any manner well known in the mechanical art and the details of which are outside the scope of the present invention.

With continued regard to the embodiment as seen in FIG. 20, the supports (3, 4) for the hydraulic devices are again locked in their closed position within the container though the pistons (3a, 4b) are now exterior to the container and positioned in an upward orientation to enable array actuation.

Figure 3:
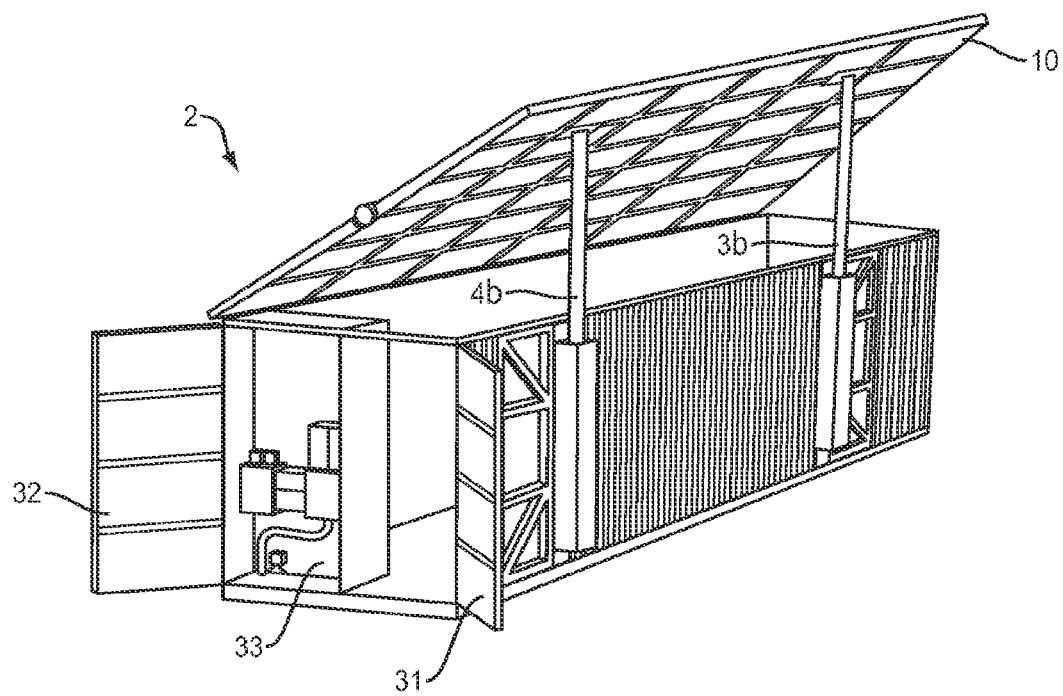
FIG. 3 is a simplified version of the embodiment shown in FIGS. 2A-2D wherein the array is fully deployed and the access doors are opened.
Figure 4:
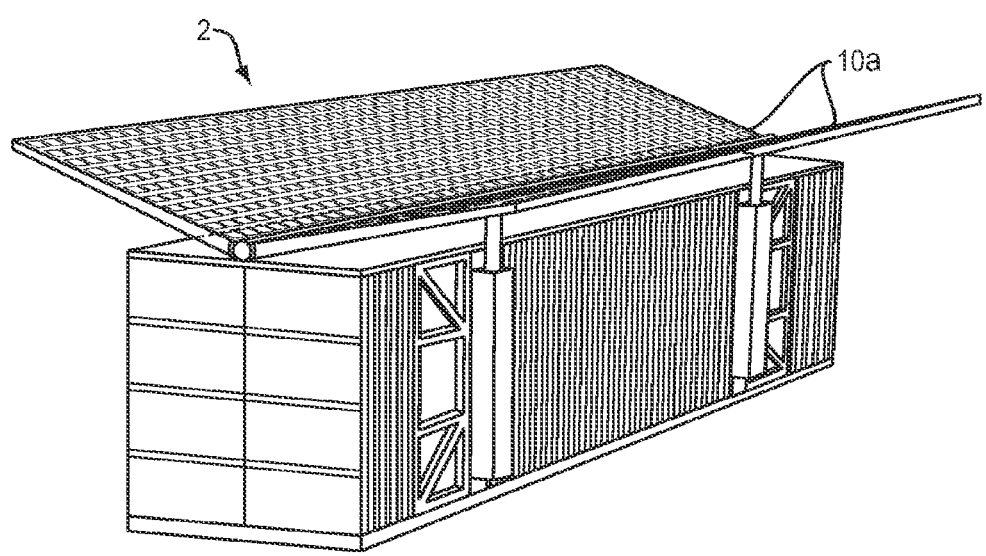
FIG. 4 is a simplified version of the embodiment shown in FIGS. 2A-2D wherein the array is semi-deployed and the access doors are closed.

For simplicity of illustration, the details of the roofing structure have been removed from FIGS. 3 and 4. However, it should be understood that such roofing structure may remain for example in the extended position seen in FIG. 20 or be retracted back into the closed position as seen is FIG. 2B. It should be noted that this closed roofing position is still possible even when, as seen in FIG. 3, the array is deployed. In such instance, the roof is able to provide an enclosed container with a workspace (e.g., for on-site technicians) which is substantially protected from the elements (i.e., rain, wind, blowing sand, etc.) and accessible through a door 31.

With further regard to FIG. 3, it can be seen that control circuitry and related electronics may be located within a secure electrical closet 33 accessible via a corresponding door 32. Doors 31 and 32 may be secured separately such that access to one does is not required for access to the other.

In either the downward position (see FIG. 2B) or upward position (see FIG. 3), once each cylinder support is placed into its working position and secured in place, the hydraulic cylinders are activated. A hydraulic pump and batteries are provided within the housing for purposes of cylinder operation. Alternatively, a small generator (as previously mentioned) may be provided in lieu of, or in addition to, batteries. A push-button controller tethered to the hydraulic pump may be used from a safe distance to activate each of the hydraulic cylinders in a coordinated manner. Any such control devices may be wired via the electrical closet 33 or may work wirelessly with one or more corresponding electrical devices within the electrical closet 33.

By coordinated manner, it is meant that each hydraulic cylinder may be extended from its cylinder support independently or simultaneously with the other three hydraulic cylinders. Such coordinated manner of operation is seen by way of FIG. 4 which is a simplified version of the embodiment shown in FIGS. 2A-20. Here, array's top surface 10a is shown in a semi-deployed position and the access doors are closed. This semi-deployed position shown represents the array configuration at either just after initial ejection from being stowed within the container or at just before array retraction into the container, both positions being effectively the same. In either instance, the mechanics of actuation of the array will transfer from the pistons to a winch and cable structure (shown and described herein below with regard to FIG. 9).

In times when the apparatus in accordance with the present invention is desired to be packed up and moved to a new location, the deployment stages shown by way of FIGS. 1 through 3 may be accomplished in reverse. In this manner, the housing is raised from the ground upon full extension of the four hydraulic devices (i.e., cylinder/piston/support). However, if the ground were uneven in any way, independent movement of any given hydraulic device would result be managed by the operator of the push-button controller so as to move the pistons to varied extension lengths so as to compensate for any unevenness or irregularities of the ground adjacent the housing. This extension of the pistons may also be accomplished through an automatic function. This function would be managed by an appropriate sensor and computer processor—e.g., a gyroscopic sensor and related processing apparatus such as a computer or ASIC—which would determine what pistons extend or retract to maintain a stable and safe raise even on uneven ground.

Once fully raised, the unit may be placed again atop a standard flatbed truck (see FIGS. 1 and 2) by backing such truck under the raised unit and reversing the hydraulic cylinder movement via the push button controller. Thus, the unit is lowered onto the flatbed truck and subsequently secured for transport. It should of course be understood that the cylinders, pistons, and their respective supports are returned to their stored positions prior to transport. While in the stored position and as already mentioned, the cylinders and their respective supports are flush with the external surface of the housing. In such flush position, a covering (not shown) is preferable to ensure protection of the hydraulics. The covering may therefore be removable and provide a surface contiguous with the outer surface of the housing. This prevents environmental factors such as rain, snow, or wind-driven debris (e.g., sand) from entering the interior of the housing and/or detrimentally affect the cylinder, hinge, and any otherwise exposed pivot points.

Any alternative to the roof structure shown in FIGS. 1 through 2C may be provided upon the housing so as to cover the PV array in its stowed position. More particularly, any suitably durable yet sunlight-permeable material may be used for the roof structure. Preferably, the roof structure may be formed from a material that is easily rolled up either manually or by way of a DC powered actuator connected to a spool running the length of the housing. The rolled material may be relatively soft and pliant or may be more stiff and harder. In this manner, the top of the housing from which the PV array ejects from and retracts into is coverable via the roof structure upon rolling out of the roof structure. The roof structure is preferably retracted when ejecting the PV array and is returned to a suitable position to cover the opening after the PV array is ejected and fully deployed. In this manner, the interior of the housing is protected from the environment (e.g., rain, wind, sand, etc.) during use of the inventive unit.

As discussed, the roof is preferably sunlight-permeable and thus allows sufficient solar power generation during transport and storage to maintain the inventive system in a ready state and preventing battery degradation during long periods of storage. Alternative roofing such as, but not limited to, transparent, impact-resistant fiberglass arranged in strips across the stowage bay, is possible so long as it functions as a transparent retractable covering. The roof structure implemented in fiberglass arranged in strips combines structural strength with flexibility between strips, through the use of rust-resistant, high-tensile rods, aluminum tubing, reinforced rubber strips, track rollers, and roller track, assembled together to form a rollable transparent roof system. The roof structure when implemented in a soft top arrangement would consist of a transparent plastic tarp. The tarp would be reinforced for extra strength, and provided with riveted eyes or other rings for securing the tarp to the housing. Also fiberglass rods or other high strength/low density material would be placed to form arches under the tarp. It is important that the materials selected for this are of low density, due to the danger of impact with the glass solar panels.

The inventive feature of a transparent roof structure to allow for diffused light to enter the PV array storage area where the array is stowed in an upright V-shaped formation allowing it to receive solar radiation for power production is heretofore uniquely advantageous. Though the power production during transport and storage is of course a fraction of full capacity, such power produced in this manner is more than sufficient to maintain the on-board batteries through trickle charging electronics. Details of trickle charging are not further discussed herein as such details are outside the scope of the present invention and known to those of ordinary skill in the battery art.

It should further be noted that both solar collection during the fully deployed arrangement and solar collection during the fully stowed (i.e., trickle charge) arrangement is enhanced in its efficiency by providing all the outputs of the individual panels in electrical parallel so that each of the solar panels operate individually. In this manner, problems commonly associated with shading are avoided. Likewise, any solar panel irradiated by sun during their limited exposure in transit or while otherwise stowed would contribute to battery maintenance.

Having now described the first functional arrangement of the dual function hydraulics, the four hydraulic devices will now be described in terms of their second functional arrangement. As was apparent by way of the earlier discussion, the first functional arrangement of the hydraulic devices was in a configuration whereby they were extended in a downwards direction to lift the unit off the ground for loading upon, and retracted for unloading, from a flatbed truck.

Figure 5:
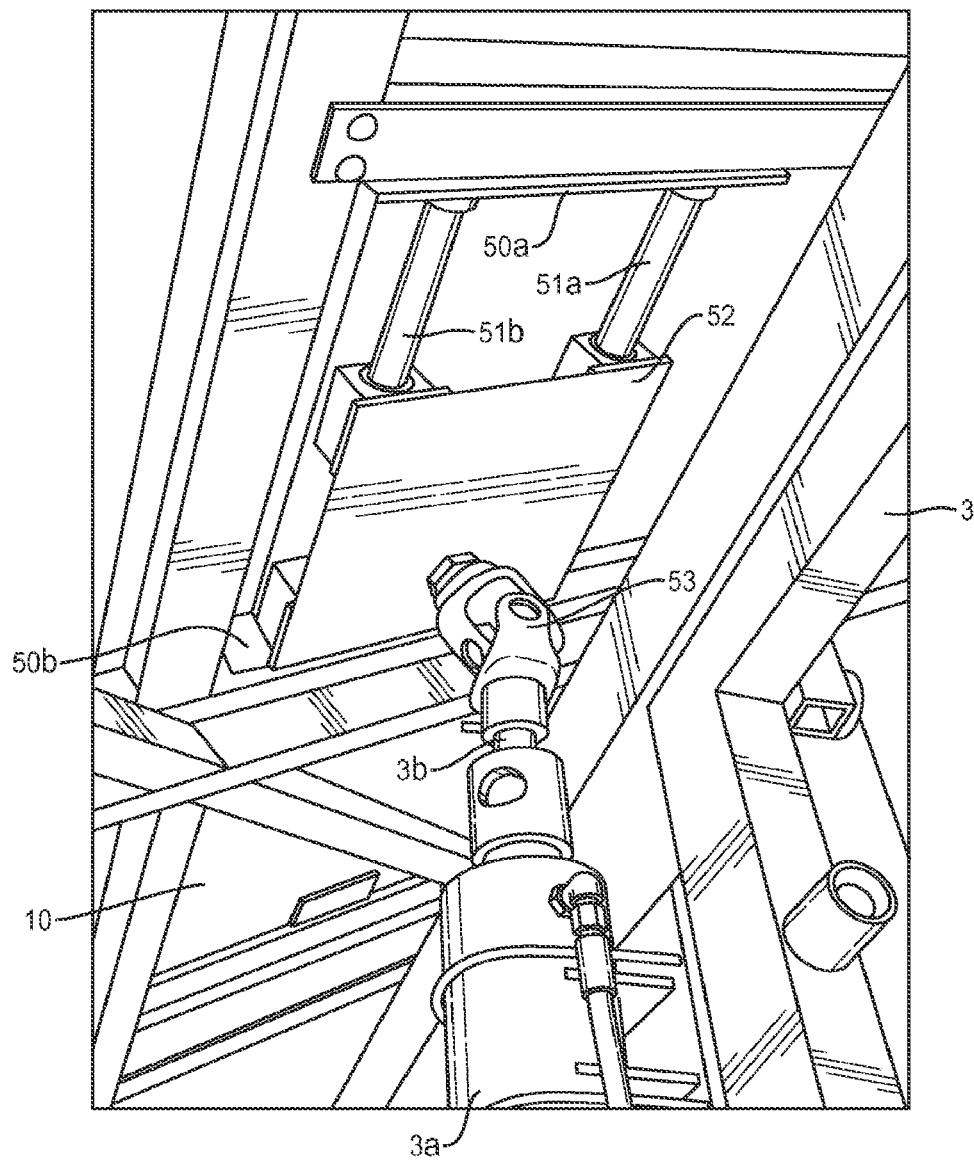
FIG. 5 is a detailed close up view of the mechanism for attachment of a hydraulic piston to an underside of the array.
Figure 6:
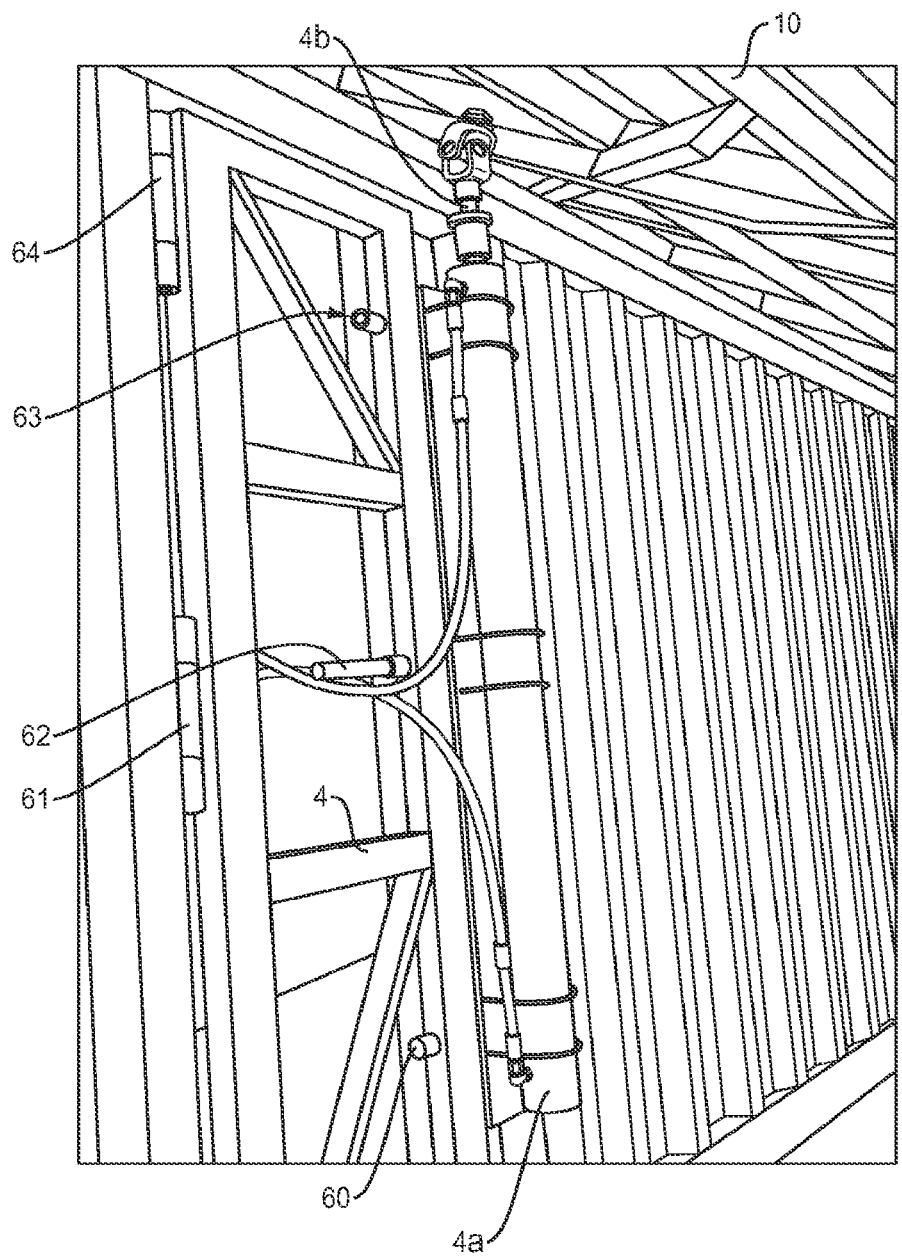
FIG. 6 is a detailed close up view of the structure supporting a hydraulic piston.

In the downwardly facing position, the non-extending end (i.e., the end without the piston) of each hydraulic cylinder generally does not extend beyond the outside top surface of the container. In the upwardly facing position, each extending end (i.e., the end with the piston) is horizontally offset from the outside top surface of the container, allowing for clearance to attach to the array for tracking as shown in FIG. 5. It is the second functional arrangement which relates to the hydraulic device being placed in a configuration so as to be operable in an upwards direction. In order to accomplish this and with regard to FIGS. 5 and 6, hydraulic piston 3a and cylinder 3b are shown in close-up detail. In particular, FIG. 5 is a detailed close up view of the mechanism for attachment of a hydraulic piston 3b to an underside 10 of the array while FIG. 6 is a detailed close up view of the door-like structure 4 supporting a hydraulic cylinder 4a. It should be readily apparent that FIGS. 5 and 6 correspond to the oppositely swinging support structures 3 and 4, respectively, as seen for example in FIGS. 1 through 4.

The piston 3a is mounted within its corresponding support via an offset swivel mechanism 62. It should be understood that each of the four supports include an offset swivel mechanism. The offset swivel mechanism 62 is visible in FIG. 6 and is basically an axle movably attached to the center edge of the frame of support 4. Such axle is movable in a sliding manner into and out of the hole in which it rests in the support frame and also movable in a rotating manner. Because the offset swivel mechanism 62 and two piloting mechanisms 60 and 63 are each fixedly connected to the hydraulic device, sliding the hydraulic device laterally when the support 4 is swung open via hinges 61, 64 will also move the offset swivel mechanism 62 and two piloting mechanisms 60 and 63. As shown, the two piloting mechanisms 60 and 63 are shorter than the offset swivel mechanism 62.

Moreover, the two piloting mechanisms 60 and 63 are interchangeable such that they may be removed and reinserted into either of their corresponding pilot holes within the frame of the support 4. This results in the piloting mechanisms 60 and 63 being able to be completely removed from their holes in the frame of the support 4 while the offset swivel mechanism 62 remains to serve as an axle about which the cylinder 4a may rotate. Such offset swivel mechanism 62 provides a pivot point that is offset horizontally in terms of the cylinder 4a. The offset and rotation enables selective movement of the cylinder 4a into and out of the exterior surface plane of the container when rotated as shown in FIG. 2. As therefore illustrated, each offset swivel mechanism enables its corresponding cylinder to be rotated 180 degrees such that piston extension (when in the array deployment stage) occurs in an upward direction towards the sky rather than the ground (which would occur in the loading/unloading stage). Extension of each hydraulic device occurs until the end of each extended piston (3b, 4b, ... etc.) meets a linear compensation translator 52 attached to underside 10 of the array that is to say, attached to the frame which supports the PV array in its extended (i.e., fully deployed position). Details of the linear compensation translator 52 and array deployment are described in further detail herein below.

It should be understood that when the cylinders are moved between the downwardly facing position and the upwardly facing position they may require decoupling from the hydraulic lines (such as those visible in FIG. 6). In such instance, a master pressure release switch may be provided for removing pressure from all hydraulic lines so as to allow quick-connect couplings to be easily removed by hand. Alternatively, swivel connections may be provided within the frame of each the hydraulic cylinder support such that disconnection/reconnection of the hydraulic lines may be avoided when moving each cylinder between the downwardly facing position and the upwardly facing position.

With continued reference to the close-up FIG. 6, the upward extension of the piston 3b enables coupling of each hydraulic device's end to underside 10 of the fully deployed array on top of the housing (i.e., container). By way of a universal joint (Ujoint) coupling 53 connecting each piston 3b with the linear compensation translators 52, the pistons are then able to raise, lower, and tilt the corner areas of the PV array so as to maintain the PV array in position facing the sun in any direction. While solar tracking in general is a commonly understood feature found throughout existing PV systems, the unique configuration of dual function hydraulics in accordance with the present invention provides advantageous reduced complexity of the overall inventive system and with reduced complexity comes increased reliability.

As mentioned, each linear compensation translator is coupled to a corresponding piston. This may be accomplished by providing the U-joint with a cap end which simply slips onto and off of the end of each corresponding piston. Advantageously, the U-joint may therefore be easily and quickly added or removed during the various deployment stages. The end of the U-joint opposite the cap end may be provided with a threaded attachment mechanism to affix the U-joint to the central surface of the linear compensation translator. With regard to FIG. 5, the linear compensation translator 52 itself includes rails 51a, 51b upon which both sliding movement and rotational movement occurs respectively in a first linear direction and an arcuate direction and channels 50*a*, 50*b* upon which movement via rollers (not shown) occurs in a second linear direction. The first and second directions are offset by 90 degrees. It should therefore be readily apparent, that movement in the X, Y, Z directions is enabled by this configuration of the linear compensation translator which includes bearings moving within the channel and a sliding/rotating rail element. Movement is further enhanced by the multidirectional U-joint coupling.

It should be readily apparent that the linear compensation translators form a unique component of the present invention. Due to the geometry of the hydraulic cylinders being fixed in place, vertical cylinder rod movement will cause changes in the horizontal position of the point of contact between each hydraulic cylinder and the PV array. The linear compensation translators serve to alleviate these changes in horizontal position by providing countering movement in the X, Y, Z directions. As previously mentioned, each linear compensation translator is formed as a trolley mechanism of roller, linear, single-ball and u-joint bearings collectively providing X, Y, Z axis movement. The trolley mechanism is housed by the PV array frame which underlies and supports the PVarray. Within the array frame, each trolley mechanism is moveable retained within the channel of the I-beam structure of the array frame. Movement of the trolley mechanism may be provided as a slide-on-rails structure or may be formed by roller bearings. In either instance, air jets via a related DC powered compressor and air conduits and lines may be provided to automatically inject air into the moving parts (i.e., slides, bearings, or the like) of the exposed trolley mechanism to alleviate any buildup of wind driven dust or sand. Preferably, the channel is lined with stainless steel sheet metal or any other suitable material so as to reduce wear and tear of the relatively softer lightweight material (e.g., aluminum or the like) from which the array frame is fabricated. The U-joint is mounted to the underside of the trolley mechanism by detachable means. The U-joint is connectable to a corresponding hydraulic cylinder through a sleeve fitting over its cylinder rod. Each U-joint may then be locked with a pin by the operator to effectively form a detachable connection between the PV array and the four hydraulic cylinders. In the horizontal position, the trolley mechanism is arranged such that the PV array will be centered by default.

The solar tracking in accordance with the present invention is achieved by the linear position sensors placed and uses in conjunction with the hydraulic cylinders. The hydraulic cylinders may have two modes. The first mode is a manual mode whereby, as described previously herein above, an operator may use a tethered push-button controller to raise and lower the hydraulic cylinders for engagement with their respective linear compensation translators. However, the second mode is a fully automated tracking mode. In this latter mode, the linear position sensors transmit electrical signals to a tracking controller that also receives solar positional data from a solar sensor placed outside of the housing. In this manner, the linear position sensors provide signals to the tracking controller which in turn controls DC hydraulic power units to raise, lower, and tilt the corners of the PV array so as to maintain the PV array in position facing the sun in any direction. This results in synchronized movement of the four hydraulic cylinders. This "four post system" formed by the four hydraulic cylinders with their respective linear compensation translators is advantageous due to the ruggedness of its collective support of the PV array.

Figure 7:
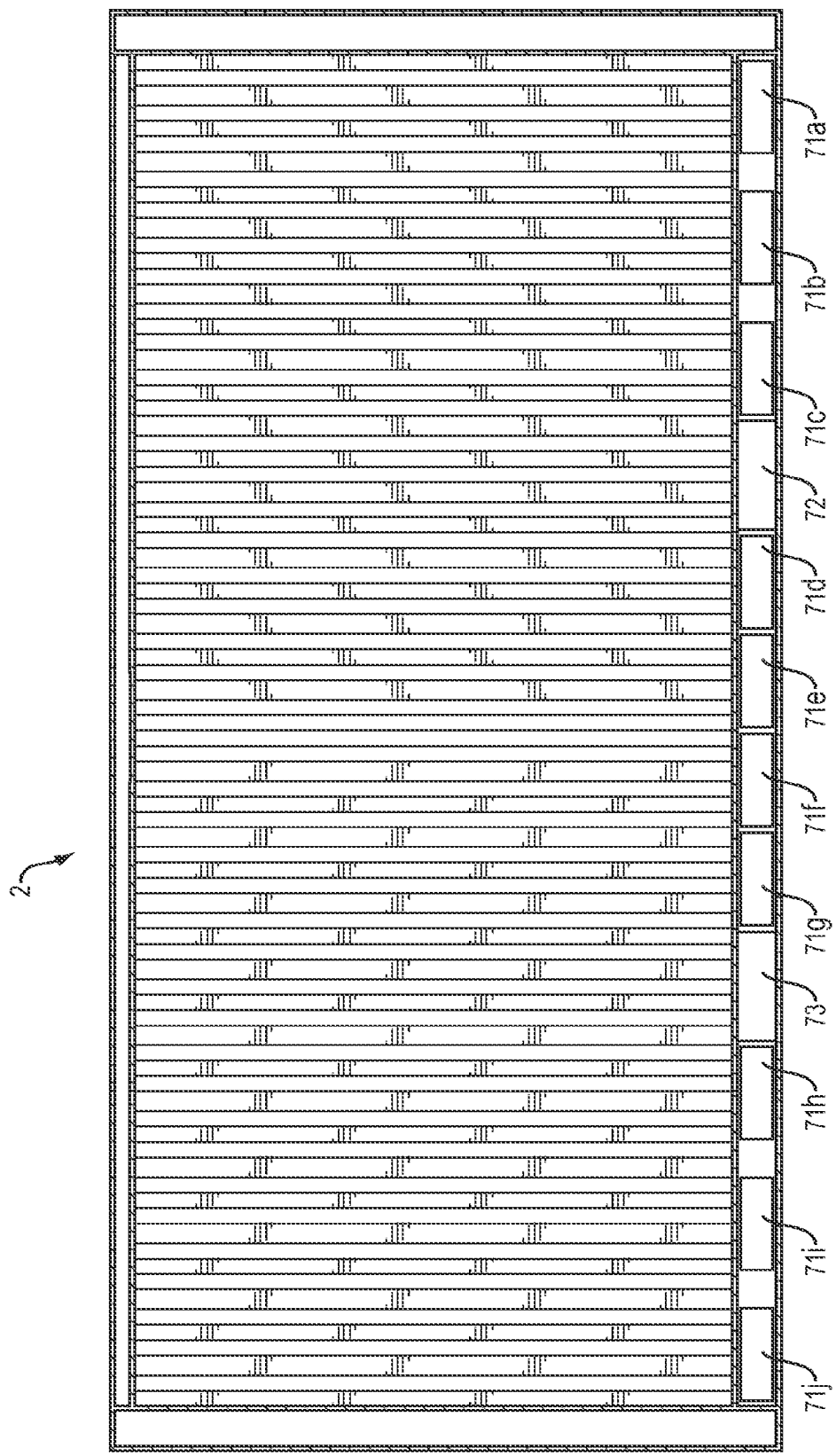
FIG. 7 is a simplified cross-section along the lengthwise direction of the present invention showing forklift spaces and battery storage spaces.
Figure 8:
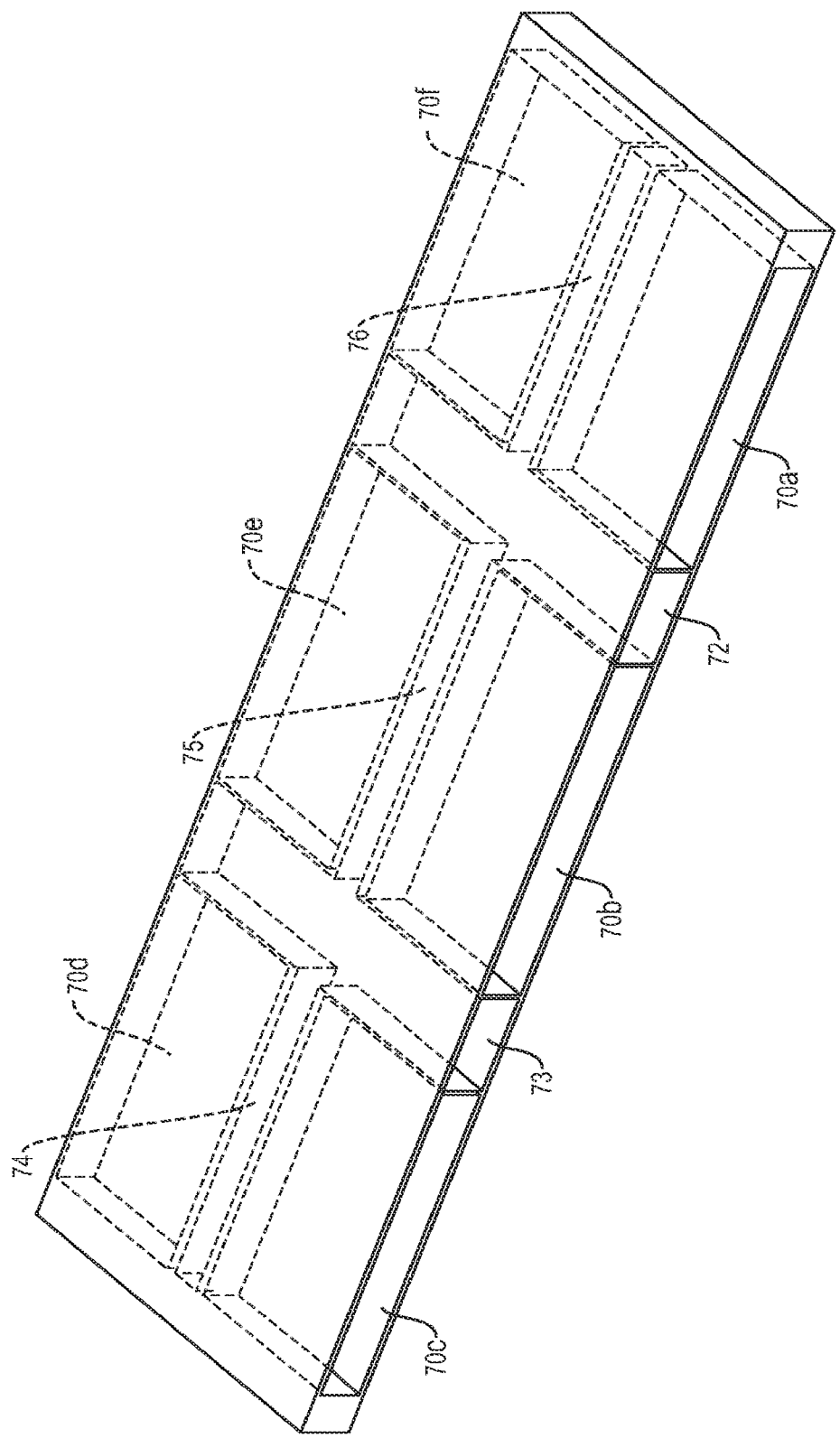
FIG. 8 is perspective view of the forklift spaces and battery storage spaces seen in FIG. 7.

As previously mentioned, batteries may be provided within the apparatus 2 of the present invention. The location of batteries presents a challenge in the present invention, however an advantageous battery configuration is illustrated with regard to FIGS. 7 and 8. In particular, FIG. 7 is a simplified cross-section along the lengthwise direction a container showing forklift spaces 72, 73 and storage space for batteries 71*a* through 71*j*. It should be understood that the number of batteries is variable based upon the desired requirements and the given battery technology. However, a common feature as is apparent from FIG. 7 is that the space used for the battery is within the floor section of the container. Such space is shown in FIG. 8 wherein a perspective view of only the flooring section is provided to better illustrate the forklift spaces 72, 73 and battery storage spaces 70*a* through 70*f*. Locating the battery compartment in the lowest area of the container below the floor provided a low center of gravity for the overall apparatus. As well, placing batteries in this area renders the interior of the container to be otherwise available for the PV array in its stowed (V-shape) position. Each battery may therefore be accessed from the lengthwise bottom outside edge of the container. In operation, batteries may be configured to slide upon rails and may mate electrically with any known plug type methods into one or more electrical busses located in areas 74, 75, 76. The battery storage spaces 70*a* through 70*f* may be kept sealed by one or more removable hatches (not shown) at the base of the container.

Figure 9:
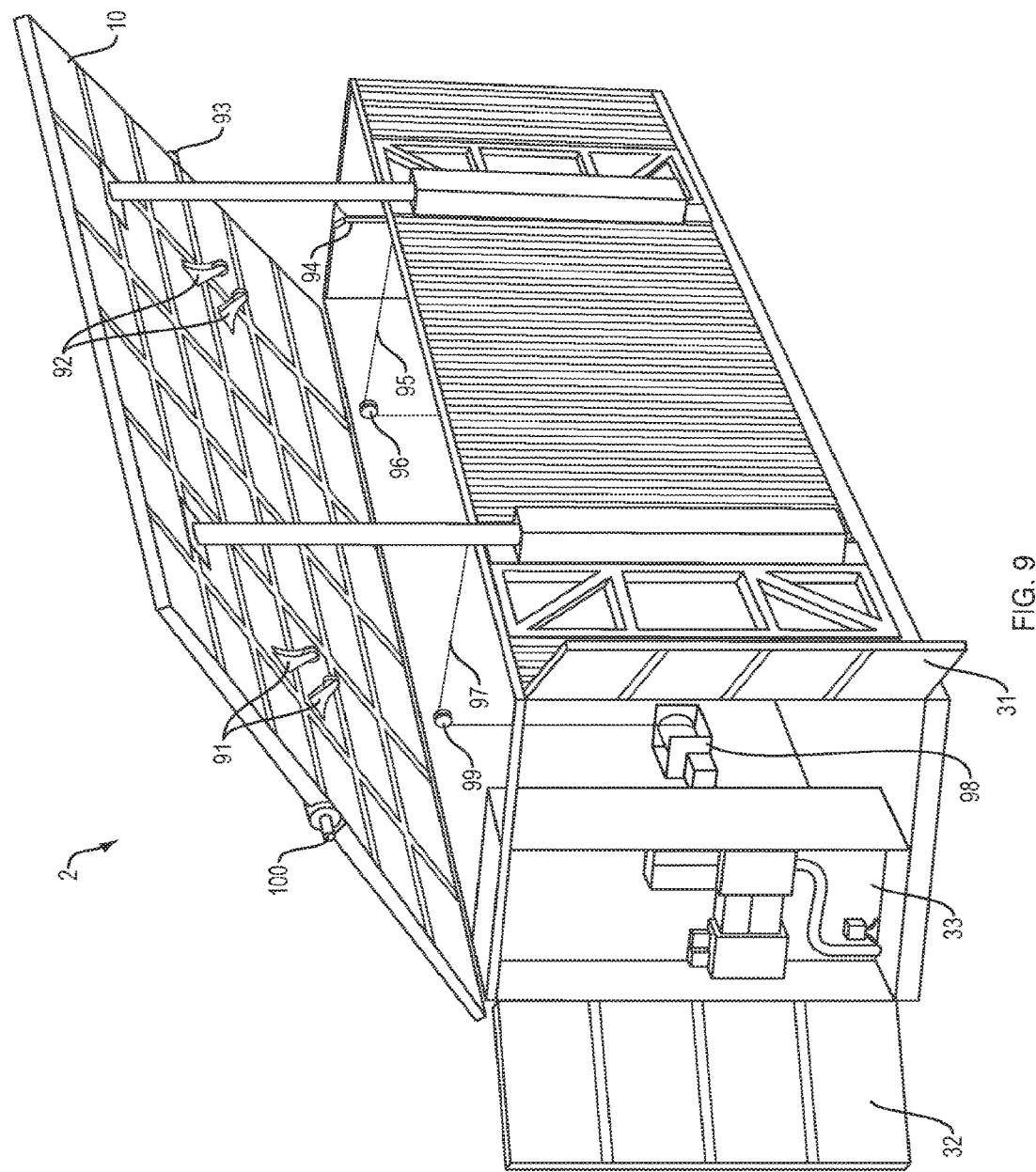
FIG. 9 is a perspective view of the present invention showing winch and cable details used for ejection and retraction of the array such as during the positioning shown in FIG. 4.

Another advantageous aspect of the present invention is the retraction mechanism which serves to both eject and retract the PV array. The retraction mechanism will now be described with regard to FIG. 9 which provides a perspective view of the present invention showing additional features not previously illustrated. In FIG. 9, winch 98 and cable 95, 97 details used for ejection and retraction of the array such as during the positioning shown in FIG. 4. As previously mentioned, the PV panels are arranged together on a frame to form the PV array, the underside 10 of which is seen. The frame itself consists of I-beams from aluminum or any other light but high strength material. The use of I-beams of course adds to the structural integrity of the frame which is designed to hold up to eighteen 240-watt solar panels. Though any other number of panels in any other wattage as can be obtained is possible, it should be understood that the preference is for the use of standardized panels for ease of maintenance and potential replacement. As mentioned, the array frame has a longitudinal hinge with ends 93 and 100. Moreover, this longitudinal hinge may be spring loaded to enhance movement during ejection and retraction. As well, this longitudinal hinge is limited in how far it can close on itself so as to prevent damage via over retraction in the stowed position.

Both ejection from the stowed position to the deployed position and retraction from the deployed position to the stowed position is enhanced with a system of cables 95 and 97 (preferably stranded steel cabling or some similarly durable material) attached to springs secured to the housing, whereby the cable runs under the hinge and is seated against rollers 91, 92 as the hinge opens and closes during retraction and ejection. This spring loaded cable effectively supports a portion of the weight of the PV array and both provides a counter resistance upon opening the array and also prevents the two hinged frame sections from closing on each other (thereby damaging the panels or worse). In operation, a DC powered winch 98 is provided within the housing. The winch 98 reels the cabling 95, 97 in or out depending upon whether, respectively, retraction or ejection is called upon. The winch 98 may be manually actuated by an operator via control circuitry located in the electrical closet 33, remotely (e.g., wireless controller), via a tethered push-button controller, or via any suitable control mechanism. The winch 98 may also be advantageously automatically actuated and controlled by sensed external criteria such as, but not limited to, environmental concerns related to wind, precipitation, blown particulates, or extended dark periods. For example, an external sensor (not shown) may provide data such that the automated controller retracts the PV array to a safely stowed position during high wind situations or during times of heavy snowfall.

As discussed, there are two hinged frame sections which form the array frame upon which the solar panels reside. Retraction and ejection of the two hinged frame sections is aided by way of the spring loaded cabling running under the hinge. It should be noted that while two such cables are shown in FIG. 9, any number of spring loaded cables may be provided based upon the materials used for the PV array (i.e., frame and panels) and the resultant weight of the PV array. In this manner, the PV array is effectively maintained as V-shaped whether in the intermediate stage (i.e., between deployed stages) as can be seen in FIG. 4, or in the fully stowed position, or maintained flat when in the fully deployed position but just prior to U-joint attachment to the not yet engaged pistons. The manner in which the PV array is retracted also provides for face-up (i.e., skyward) positioning within in the stowage bay of the housing during transport and storage. This stowed placement in combination with the V-shaped formation provides advantageous opportunity for all panels to have potential to receive sunlight. When combined with suitable electrical components known in the art of trickle charging, the present invention therefore provides for adequate levels of charging operation to maintain the on-board batteries even when not fully deployed. This both increases battery life and facilitates usage of the charged on-board batteries for deployment of the array.

As further shown in FIG. 9, the retraction and ejection of the two hinged frame sections is further enhanced by way of guide posts 93, 100 integrated into the ends of the central hinge. The guide posts ride channels (only one visible as 94) when the array is retracted or ejected. The channels are wider at the top opening thereof to enable the guide posts during retraction to slip into the channel and thereby ride the channel downward. The channels are preferably provided from the top of the housing to the floor of the housing. Accordingly, piloted movement is assured to securely stow the array as well as accurately eject the array during deployment.

It should be understood that controllers as discussed herein for operation of the various elements of the present invention may be in the form of any suitable computing device including, but not limited to, an on-board central processing unit (CPU), separate application specific integrated circuits (ASICs), or may even provide for remote control (via satellite or any wireless technology) from a CPU located any distance from the invention.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A photovoltaic (PV) power apparatus for rapid deployment, said apparatus comprising:
   a housing;
   a PV array having a collection of solar panels mounted upon a frame, said frame including two sections connected via a lengthwise primary hinge such that said PV array forms a V-shaped cross section when placed in a stowed position within said housing, said PV array being capable of movement from said stowed position to a deployed position atop said housing;
   a plurality of supports, each said support being movably attached to said housing via a corresponding one of a set of secondary hinges, each said support capable of movement between a closed position where each said support is aligned flush with a surface of said housing and an open position:
   a plurality of hydraulic devices, each said hydraulic device including a cylinder and a piston being mounted within a corresponding one of said supports;
   a set of pivot points, each centrally located at a midway location on each said support and about which each said hydraulic device is rotatable 180 degrees when each said support is in said open position to switch between an upwardly actuating position such that each said piston is extendable upward to contact said PV array and a downwardly actuating position such that each said piston is extendable downward to contact a ground surface; and
   wherein each said hydraulic device in said upwardly actuating position enables movement of said PV array and each said hydraulic device in said downwardly actuating position enables movement of said housing.

2. The apparatus as claimed in claim 1 wherein each said hydraulic device in said upwardly actuating position contact a corresponding one of a plurality of linear compensation translators, each said linear compensation translator being mounted in a moveable manner within said frame such that each said linear compensation translator provides movement of said PV array along each of an x-axis, y-axis, and z-axis relative to a longitudinal axis of selected cylinder with which each said linear compensation translator is in contact.

3. The apparatus as claimed in claim 2, said apparatus further including a detachable multi-directional coupling for removable attachment between a selected piston and a selected linear compensation translator.

4. The apparatus as claimed in claim 3 wherein an offset swivel mechanism provides a selected pivot point, said offset swivel mechanism being located within a frame of a selected support.

5. The apparatus as claimed in claim 4 wherein each said hydraulic device while in said downwardly actuating position enables vertical movement of said housing sufficient to allow a cargo area of a vehicle under said housing.

6. The apparatus as claimed in claim 5 further including at least one winch and cabling arranged within said housing, said frame of said PV array including rollers for engaging said cabling during movement of said PV array just prior to and just after placement into said stowed position.

7. The apparatus as claimed in claim 6 further including a roof for said housing, said roof having segments configured to eject horizontally relative to a top of said housing and laterally relative to a center of said housing so as to allow ejection of said PV array via said winch and cabling.

8. The apparatus as claimed in claim 7 wherein said roof is fabricated from a material transparent to light so as to allow for trickle charging of batteries by said PV array while said PV array is in said stowed position.

9. The apparatus as claimed in claim 8 further including at least one access door for
   access to an interior of said housing.

10. The apparatus as claimed in claim 9 further including at least one electrical closet having access separate from said access door, said electrical closet providing space for control electronics.

11. The apparatus as claimed in claim 10 wherein said housing further includes a battery area located beneath a floor of said interior of said housing.

12. The apparatus as claimed in claim 11 wherein said housing is a shipping container and includes access to said battery area, said access being adjacent to forklift through holes formed within a base of said shipping container.

13. The apparatus as claimed in claim 7 wherein said two sections of said frame of said PV array include a longitudinal hinge connecting said two sections, said longitudinal hinge including ends forming guide posts, said guide posts configured to ride channels located at interior ends of said housing during movement of said PV array just before and just after said stowed position.

14. The apparatus as claimed in claim 13 wherein said cabling engages said rollers during engagement of said guide posts with said channels thereby maintaining said PV array securely in said V-shape cross section.

* * * * *